(12) United States Patent
Fan (10) Patent No.: US 9,193,414 B2
(45) Date of Patent: Nov. 24, 2015

(54) KICK SCOOTER

(71) Applicant: HSIN LUNG ACCESSORIES CO., LTD., Hsin-Chu Hsien (TW)

(72) Inventor: Cheng-Neng Fan, Taoyuan (TW)

(73) Assignee: HSIN LUNG ACCESSORIES CO., LTD, Hsin-Chu Hsien (TW)

( * ) Notice: Subject to any disclaimer, the term of this patent is extended or adjusted under 35 U.S.C. 154(b) by 33 days.

(21) Appl. No.: 14/064,256

(22) Filed: Oct. 28, 2013

(65) Prior Publication Data

US 2014/0117641 A1 May 1, 2014

(30) Foreign Application Priority Data

Oct. 29, 2012 (TW) .............................. 101220890 U
Oct. 21, 2013 (TW) .............................. 102219637 U (51) Int. Cl.
*A63C 17/01* (2006.01)
*B62M 1/24* (2013.01)
*B62K 3/00* (2006.01)

(52) U.S. Cl.
CPC . *B62M 1/24* (2013.01); *B62K 3/002* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,065,146 A | * | 12/1977 | Denzer ......................... | 280/278 |
| 4,088,338 A | * | 5/1978 | Winchell et al. .............. | 280/220 |
| 4,775,162 A | * | 10/1988 | Chao ........................ | 280/87.041 |
| 4,811,971 A | * | 3/1989 | Phillips ..................... | 280/87.041 |
| 5,785,331 A | * | 7/1998 | Rappaport ............... | 280/87.041 |
| 6,485,039 B1 | * | 11/2002 | Ming-Fu .................. | 280/87.041 |
| 6,719,310 B1 | * | 4/2004 | Lin .......................... | 280/87.041 |
| 6,880,840 B2 | * | 4/2005 | Chuang .................... | 280/87.041 |
| 6,883,814 B2 | * | 4/2005 | Chuang .................... | 280/87.041 |
| 6,908,090 B2 | * | 6/2005 | Chuang .................... | 280/87.041 |
| 7,192,038 B2 | * | 3/2007 | Tsai ......................... | 280/87.041 |
| 7,549,655 B2 | * | 6/2009 | Fan .......................... | 280/87.041 |
| 8,205,895 B2 | * | 6/2012 | Chen et al. ............... | 280/87.041 |
| 8,328,209 B2 | * | 12/2012 | Tsai ......................... | 280/87.043 |
| 8,505,945 B2 | * | 8/2013 | Chen ............................ | 280/220 |
| 2010/0201096 A1 | * | 8/2010 | Fan .............................. | 280/230 |
| 2011/0298193 A1 | * | 12/2011 | Fan .............................. | 280/221 |
| 2014/0070508 A1 | * | 3/2014 | Yamabe .................... | 280/87.041 |
| 2014/0117641 A1 | * | 5/2014 | Fan .............................. | 280/228 |

* cited by examiner

*Primary Examiner* — Jeffrey J Restifo
*Assistant Examiner* — Erez Gurari
(74) *Attorney, Agent, or Firm* — Jackson IPG PLLC; Demian K. Jackson (57) ABSTRACT

A kick scooter at least includes a vehicle frame, an upright arm, a handle, a front wheel, left and right bearing bars, a flexible linkage mechanism, left and right rear wheels, and left and right footboards. The upright arm and the left and the right bearing bars are assembled to the vehicle frame. The handle and the front wheel are respectively mounted to an upper end and a lower end of the upright arm. The flexible linkage mechanism is coupled between the upright arm and the left and right bearing bars to provide the left and right bearing bars with swinging torques. The left and right rear wheels as well as the left and right footboards are respectively disposed at positions near rear ends of the left and right bearing bars. Centers of gravity of the left and right footboards are located between the left and right rear wheels.

18 Claims, 10 Drawing Sheets

KICK SCOOTER

BACKGROUND OF THE INVENTION a) Field of the Invention

The invention relates in general to a kick scooter, and more particularly to a kick scooter having a simple structure and convenient usability that provide a user with a maximum driving force and a maximum velocity of movement.

b) Description of the Related Art

A conventional three-wheel kick scooter chiefly includes an upright control arm and a pair of vehicle frames. The upright control arm includes a handle at an upper end thereof and a front wheel at a lower end thereof. The vehicle frames are disposed with left and right rear wheels at ends thereof, respectively. By treading both feet on left and right footboards of the kick scooter and swinging a user body left and right, a vehicle body of the kick scooter is driven to move forward. Three points of contact are formed by the front wheel and the rear left and right wheels, allowing a user securely step on the left and right footboards. By incorporating twisting of the handle or the body, the upright control arm can be swung left and right. As such, by further respectively applying downward forces on the left and right footboards, the front wheel is propelled to roll forward along a zigzag path to perform a forward motion.

Although the conventional kick scooter above achieves sliding movements as well as exercise for a rider on the kick scooter, through theoretical applications based on machinery mechanics and practical design verifications, the kick scooter may yet be further improved to offer more enhanced performance. For example, referring to FIG. 1, left and right rear wheels 11 and 12 are respectively mounted to rear ends of bearing bars 15, and force receiving positions at which a rider treads on left and right footboards 13 and 14 are respectively at upper parts of the left and right rear wheels 11 and 12. When the rider alternatively applies downward forces F1 and F2 on the left and right footboards 13 and 14, as a left fulcrum 111 and a right fulcrum 121 are respectively formed between the left and right rear wheels 11 and 12 and the ground in contact, a counterclockwise rotary torque is produced at the left footboard 13 due to the moment generated (by an arm d1×the force F1). Similarly, a counterclockwise rotary torque is produced at the right footboard 14 due to the moment generated (by an arm d2×the force F2). At this point, first of all, since the force receiving positions of the left and right footboards 13 and 14 are at the upper parts of the left and right rear wheels 11 and 12 in a way that the left and right footboards 13 and 14 are near the left and right fulcrums 111 and 121 of the left and right rear wheels 11 and 12, the moment generated is smaller on account of a shorter moment arm. Thus, the left and right footboards 11 and 12 cannot be provided with a large rotary torque and a lower overall treading efficiency is obtained.

Figure 1:
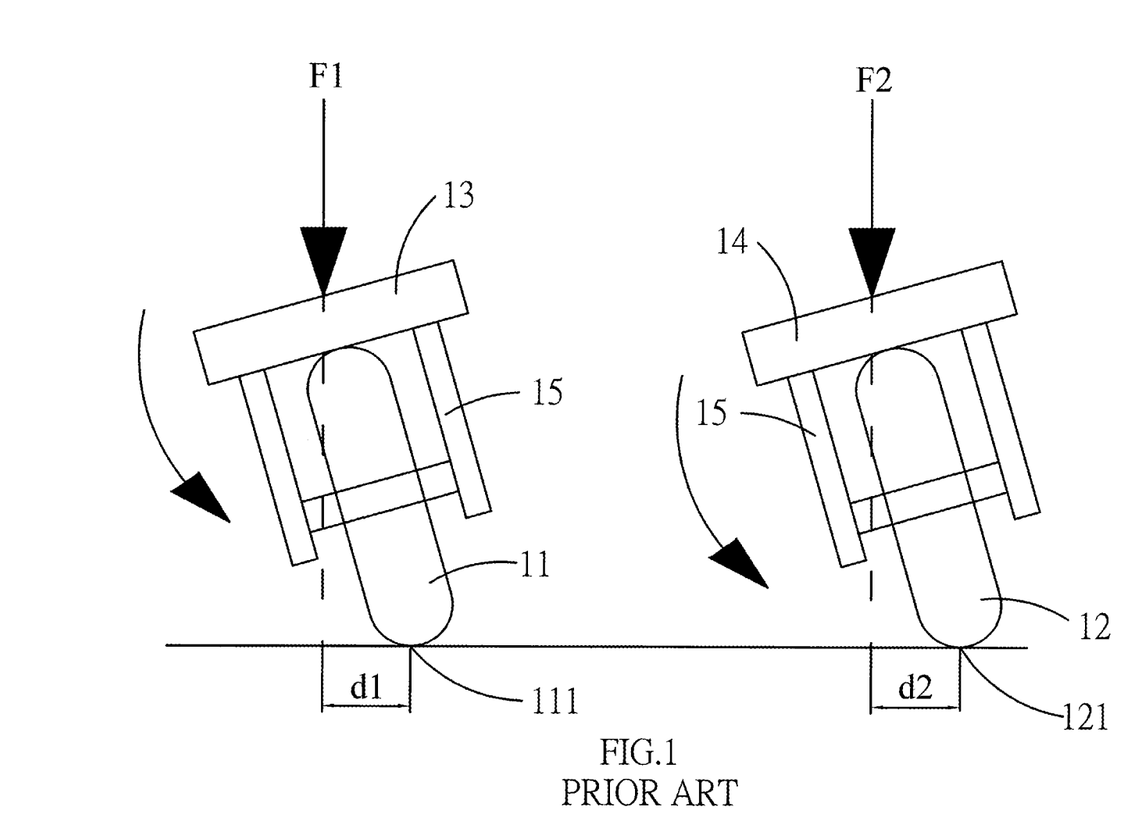
FIG. 1 is a schematic diagram of footboards and rear wheels receiving treading forces in a conventional kick scooter.

Secondly, the moment exerted on the left footboard 13 causes a counterclockwise rotary torque and the moment exerted on the right footboard 14 also causes a counterclockwise rotary torque. Owing to the counterclockwise rotary torques exerted on the left and right rear wheels 11 and 12 and frictions generated by the counterclockwise rotary torques against the ground, the downward treading forces may be diminished. Because of the above reasons, the downward treading forces of the rider are diminished, which reduces the efficiency of the downward treading forces and hinders the rider from obtaining a greater velocity of movement.

SUMMARY OF THE INVENTION

The invention is directed to a kick scooter having a simple structure and convenient usability that provide a user with a maximum driving force and a maximum velocity of movement.

To achieve the above object, a kick scooter of the present invention at least comprises a vehicle frame, a handle, an upright arm, a front wheel, left and right bearing bars, a flexible linkage mechanism, left and right rear wheels, and left and right footboards. The upright arm and the left and right bars are respectively assembled to the frame. The handle and the front wheel are respectively mounted at an upper end and a lower end of the upright arm. The flexible linkage mechanism is coupled between the upright arm and the left and right bearing bars to provide the left and right bearing bars with swinging torques. The left and right rear wheels are respectively disposed near rear ends of the left and right bearing bars. The left and right footboards are respectively disposed near rear ends of the left and right bearing bars, and have centers of gravity located between the left and right rear wheels.

In the present invention, by changing original centers of gravity of the left and right footboards to between the left and right rear wheels, rotational directions of moments of the left and right footboards can be changed. Thus, treading forces of a rider can be prevented from diminishing, thereby enhancing efficiency of the treading forces as well as offering the rider with a maximum velocity of movement.

To achieve the above object, the flexible linkage mechanism comprises two axial sleeves, at least two elastic buffer elements, a linkage body and a through axis. The axial sleeves are respectively disposed at the vehicle frame and are relative to front ends of the left and right bearing bars. The elastic buffer elements are accommodated in the axial sleeves. The linkage body has two sides thereof axially mounted to the respectively elastic buffer elements. The through axis is disposed at the linkage body and faces the upright arm, such that interference if formed between the linkage body and the upright arm via the through axis.

The linkage body is a U-shaped body, and has two sides thereof respectively provided with two fixing members for connecting respective axial plates and the elastic buffer elements. The linkage body is further inserted into the elastic buffer elements accommodated in the axial sleeves.

To achieve the above object, the linkage body is disposed relatively to a front end of the upright arm, or disposed relatively to a rear end of the upright arm.

To achieve the above object, the flexibly linkage mechanism is a flexible body.

The flexibly body at least comprises glass fiber, a soft metal or polyurethane.

To achieve the above object, the kick scooter further comprises a collapsible mechanism. The collapsible mechanism is disposed between the left and right bearing bars, and is for collapsing the left and right bearing bars.

The collapsible mechanism comprises pivotal bolts, adjusting members and elastic elements. The pivotal bolts are pivotally disposed between the vehicle frame and the left and right bearing bars. The adjusting members are located at front ends of the respective pivotal bolts, and securely fix the left and right bearing bars onto the vehicle frame. The elastic elements are accommodated around the respective adjusting members, and provide forces for moving the respective adjusting members outward in a normal condition.

The collapsible mechanism further comprises blocking members. The blocking members are located in the left and right bearing bars and relative to axial positions of the respective adjusting members, so that the adjusting members are retained by the blocking members and prevented from total disengagement from the left and right bearing bars when the adjusting members move outward.

To achieve the above object, a center of gravity of the left rear wheel utilizes a rearmost end of the left footboard as a center, is located in the second quadrant or the third quadrant, and has an angle θ1 ranging between 90 degrees and 270 degrees (i.e., 90 degrees<θ1<270 degrees). Preferably, the center of gravity of the left rear wheel is in the third quadrant, and the angle θ1 is greater than or equal to 180 degrees and smaller than 270 degrees (i.e., 180 degrees≤θ1<270 degrees). Most preferably, the center of gravity of the left rear wheel is 180 degrees.

To achieve the above object, a center of gravity of the right rear wheel utilizes a rearmost end of the right footboard as a center, is located in the first quadrant or the fourth quadrant, and has an angle θ2 greater than or equal to 0 degree and smaller than 90 degrees or θ2 greater than 270 degrees and smaller than or equal to 360 degrees. Preferably, the center of gravity of the right rear wheel is in the fourth quadrant, and the angle θ2 is greater than 270 degrees and smaller than or equal to 360 degrees. Most preferably, the center of gravity of the left rear wheel is 0 degree or 360 degrees.

To achieve the above object, a left fulcrum and a right fulcrum are respectively formed at contact points of the left and right rear wheels and the ground. Centers of gravity of the left and right footboards are located between the left and right fulcrums.

To achieve the above object, the vehicle frame comprises a main body. Two sides of the main body are respectively provided with axial plates disposed at an interval. The upright arm is mounted on the main body. The left and right bearing bars have front ends thereof pivotally disposed at one side of the respective axial plates, and the flexible linkage mechanism is disposed at the other side of the axial plates.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
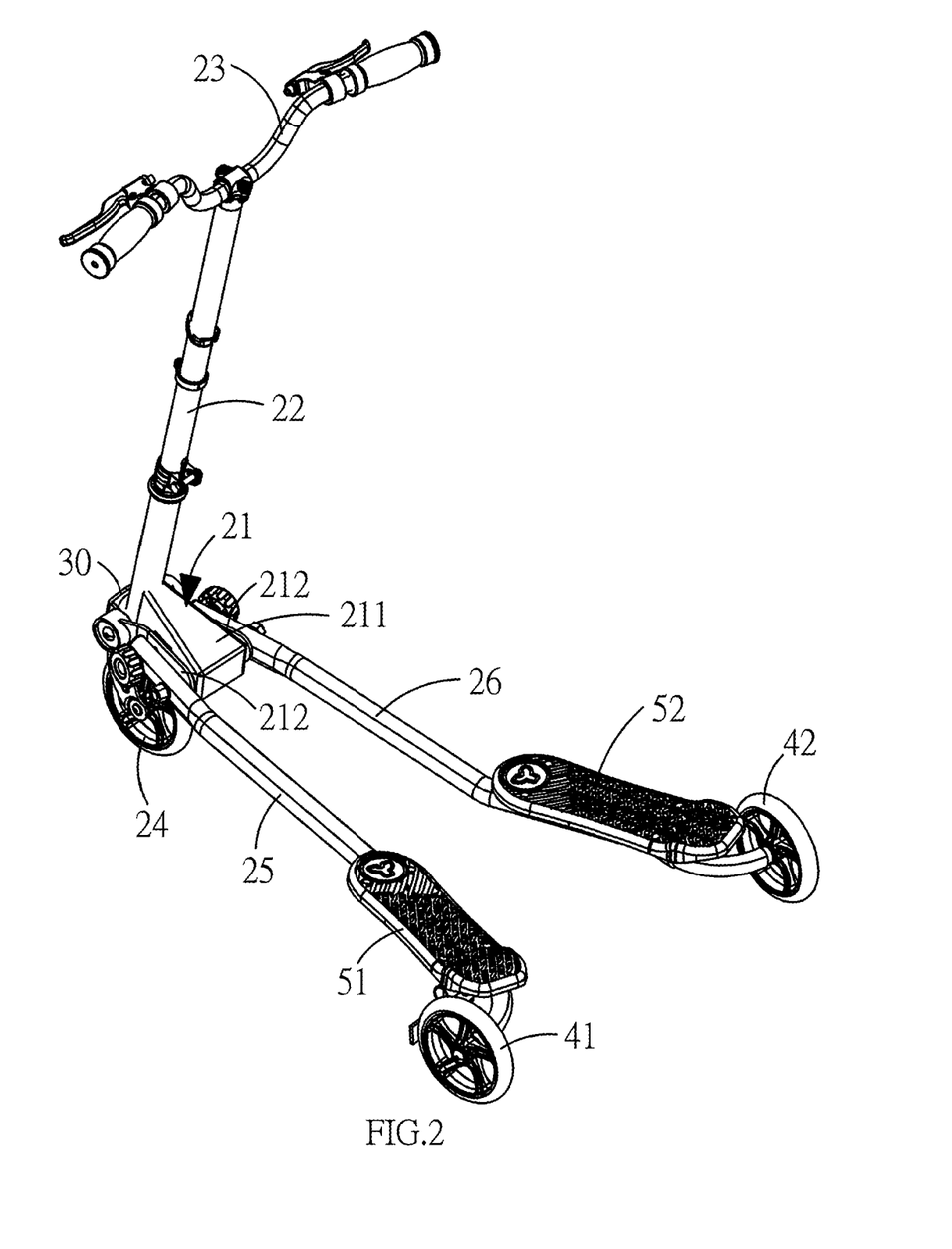
FIG. 2 is a structural perspective view of a kick scooter of the present invention.

FIG. 2 shows a structural perspective view of a kick scooter of the present invention. Referring to FIG. 2, the kick scooter of the present invention at least comprises a vehicle frame 21, an upright arm 22, a handle 23, a front wheel 24, left and right bearing bars 25 and 26, a flexible linkage mechanism 30, left and right rear wheels 41 and 42, and left and right footboards 51 and 52.

The upright arm 22 is disposed on the vehicle frame 21. The handle 23 is mounted to an upper end of the upright arm 22. The front wheel 24 is mounted to a lower end of the upright arm 22. The left and right bearing bars 25 and 26 have front ends thereof assembled to the vehicle frame 21. The flexible linkage mechanism 30 is coupled between the upright arm 22 and the left and right bearing bars 25 and 26, and provides the left and right bearing bars 25 and 26 with swinging torques. The vehicle frame 21 may comprise a main body 211 (e.g., a triangular body as shown), which has two sides thereof disposed with axial plates 212 at an interval from the sides. The upright arm 22 is mounted on the main body 211. The left and right bearing bars 25 and 26 have front ends thereof pivotally disposed at one side of the respective axial plates 212, and the flexible linkage mechanism 30 is disposed at the other side of the axial plates 212.

Figure 3:
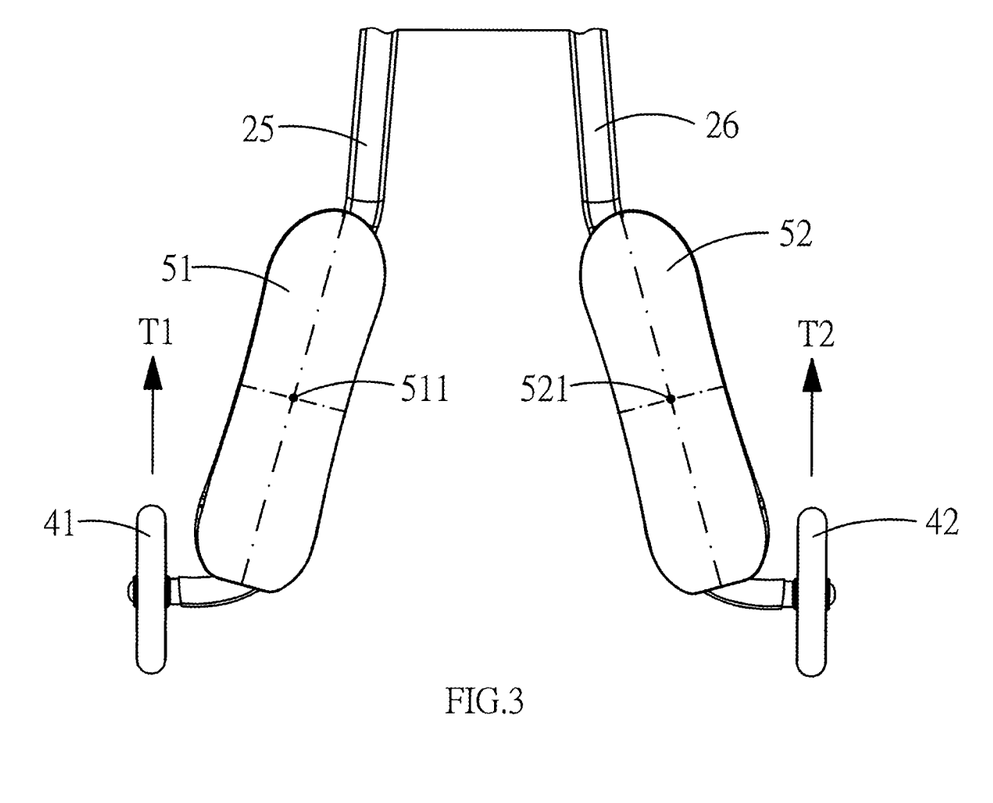
FIG. 3 is a structural schematic diagram of footboards and rear wheels of a kick scooter of the present invention.

The left and right rear wheels 41 and 42 are respectively mounted near rear ends of the left right bearing bars 25 and 26. Referring to FIG. 3, rolling directions T1 and T2 of the left and right rear wheels 41 and 42 are respectively located at outer sides of the left and right bearing bars 25 and 26. The rolling directions of the left and right rear wheels 41 and 42 may also be located at rear parts of the left and right bearing bars 25 and 26.

The left and right footboards 51 and 52 are respectively disposed at on positions near rear ends of the left and right bearing bars 25 and 26, and have respective centers of gravity 511 and 521 located between the left and right rear wheels 41 and 42.

Figure 4:
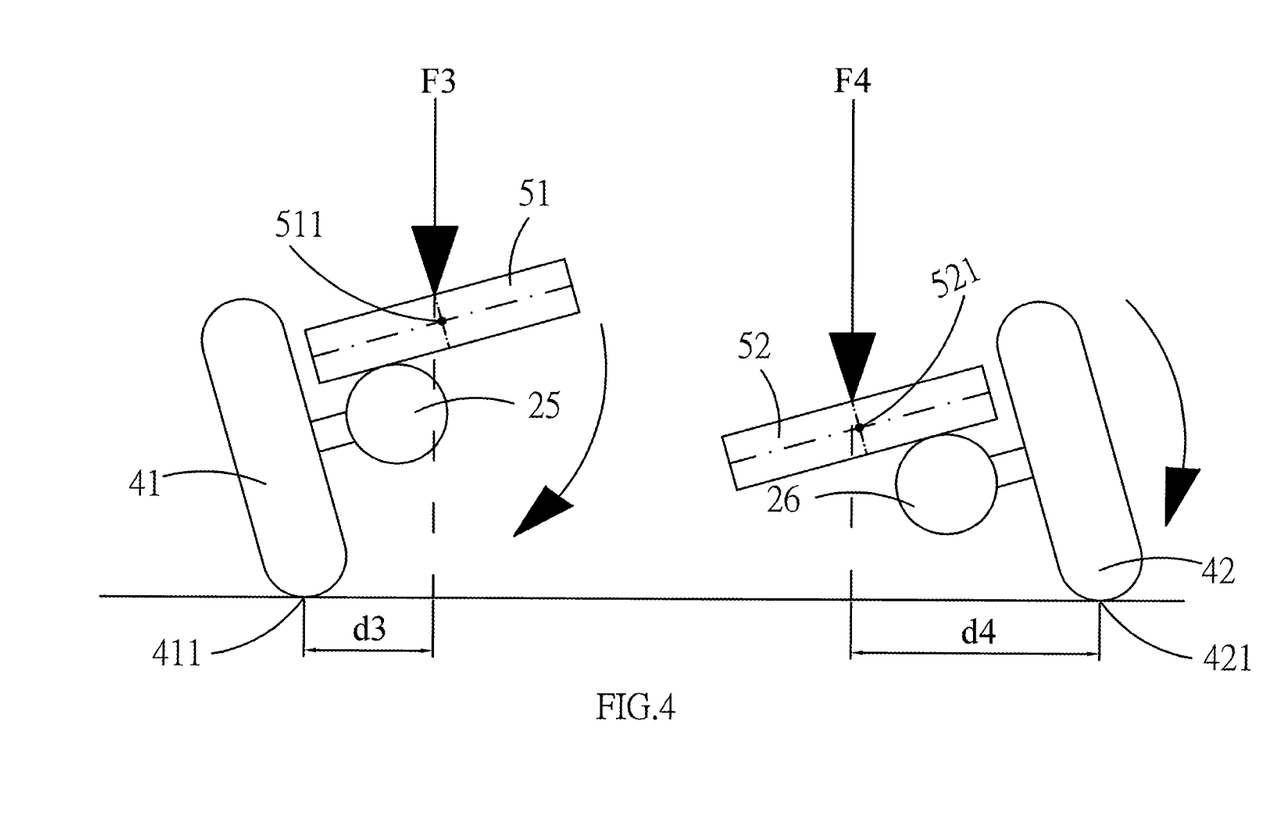
FIG. 4 is a schematic diagram of operations of footboards and rear wheels receiving treading forces in a kick scooter of the present invention.

Referring to FIG. 4, when riding the kick scooter, a rider alternately applies downward forces F3 and F4 on the left and right footboards 51 and 52, respectively. A left fulcrum 411 and a right fulcrum 421 are formed by contact points of the left and right rear wheels 41 and 42 with the ground. The centers of gravity 511 and 521 of the left and right footboards 51 and 52 are located between the left and right fulcrums 411 and 421. A clockwise rotary torque is produced at the left footboard 51 due to the moment generated (by an arm d3×the force F3), and a clockwise rotary torque is similarly produced at the right footboard 52 due to the moment generated (by an arm d4×the force F4).

In the present invention, first of all, original centers of gravity of the left and right footboards 51 and 52 are relocated to between the left and right rear wheels 41 and 42, such that positions receiving forces from the rider are between the left and right wheels 41 and 42 and away from the left and right fulcrums 411 and 421 of the left and right rear wheels 41 and 42. As a result, the moments produced are greater on account of longer moment arms, and thus the left and right footboards 51 and 52 are given greater rotary torques to yield greater treading efficiency.

Secondly, in the present invention, by changing original rotational directions of moments of the left and right footboards 51 and 52, clockwise rotary torques are produced at the left and right footboards 51 and 52 by the moments applied to the left and right footboards 51 and 52. Since the rotary torques are respectively applied to the left and right rear wheels 41 and 42 and away from the ground to be friction-free with the ground, the treading forces are prevented from diminishing. Because of the above reasons, the downward treading forces of the rider are prevented from diminishing, and the efficiency of the downward treading forces is enhanced to offer the rider with a maximum velocity of movement.

Figure 5A:
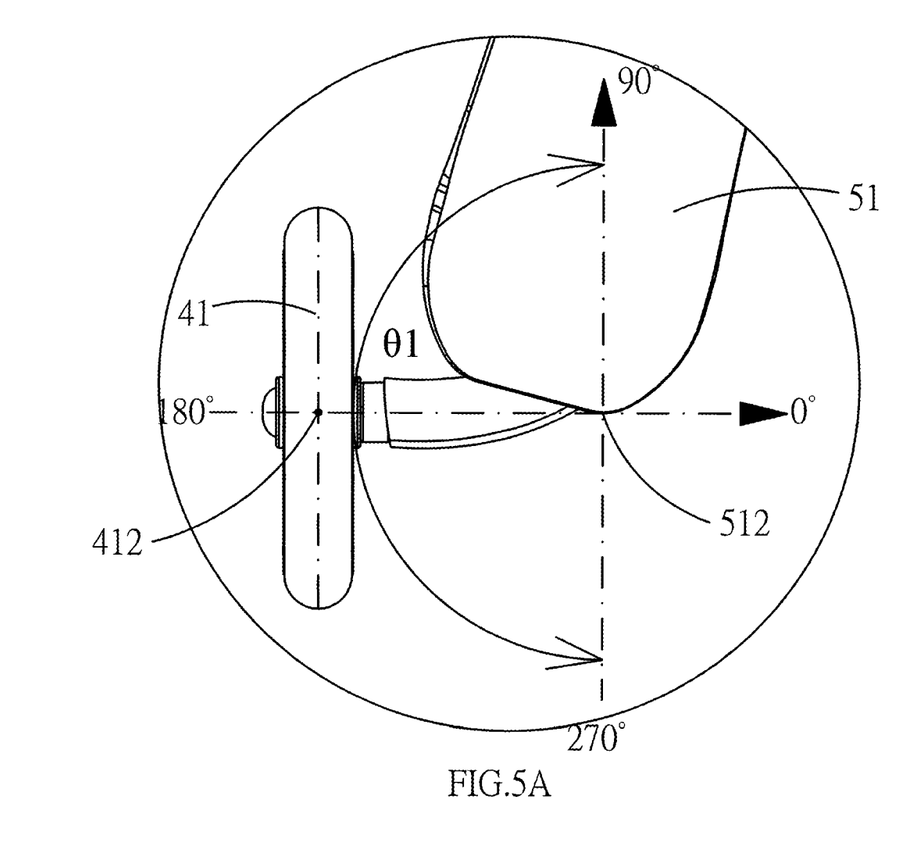
FIGS. 5(A) and 5(B) are enlarged schematic views of footboards and rear wheels of a kick scooter of the present invention.
Figure 5B:
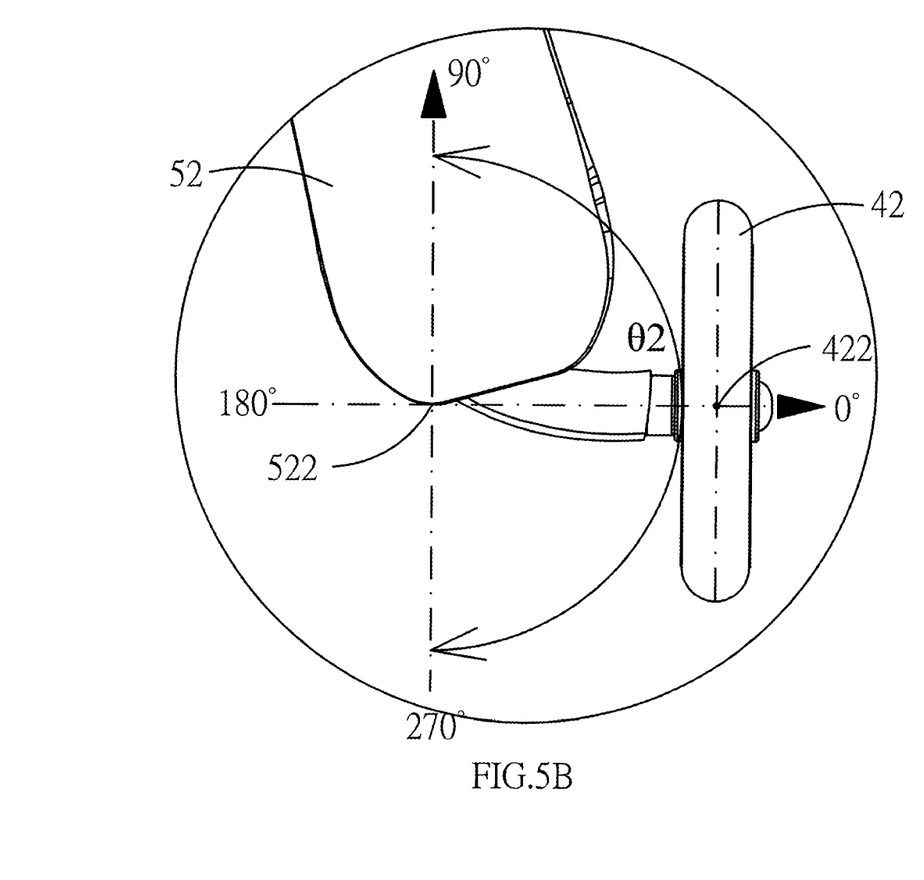

As shown in FIG. 5(A), an axial position 412 of the left rear wheel 41 utilizes a rearmost end of the left footboard 51 as a center 512, is in the second quadrant and the third quadrant, and has an angle θ1 ranging between 90 degrees and 270 degrees (i.e., 90 degrees<θ1<270 degrees—the angle range indicated by the arched arrow). Preferably, the center of gravity of the left rear wheel 41 is located in the third quadrant, and has an angle θ1 greater than or equal to 180 degrees and smaller than 270 degrees (most preferably 180 degrees). As shown in FIG. 5(B), an axial position 422 of the right rear wheel 42 utilizes a rearmost end of the right footboard 52 as a center 522, is located within the first quadrant and the fourth quadrant, and has an angle θ2 greater than or equal to 0 degree and smaller than 90 degrees or θ2 greater than 270 degrees and smaller than or equal to 360 degrees (i.e., θ2—the angle range indicated by the arched arrow). Preferably, the center of gravity of the right rear wheel 42 is located in the fourth quadrant, and has an angle θ2 greater than 270 degrees and smaller than or equal to 360 degrees (most preferably 0 degree or 360 degrees). An adjusting mechanism may further be provided between the left and right rear wheels 41 and 42 and the left and right bearing bars 25 and 26. The adjusting mechanism is capable of adjusting positions and angles of the left and right rear wheels 41 and 42 to adapt to movement requirements of different users.

In an example, a conventional kick scooter and a kick scooter of the present invention are tested for treading efficiency by several riders. Experimental results are as shown below.

| | Rider A | Rider B | Rider C | Rider D | Rider E |
|---|---|---|---|---|---|
| Conventional kick scooter | X | X | X | Δ | X |
| Kick scooter of present invention (center of gravity of left rear wheel at 180 degrees; center of gravity of right rear wheel at 0 degree) | ⊙ | ⊙ | ⊙ | ⊙ | ⊙ |
| Kick scooter of present invention (center of gravity of left rear wheel at 250 degrees; center of gravity of right rear wheel at 290 degrees) | ⊙ | Δ | ⊙ | ⊙ | Δ |

Figure 6:
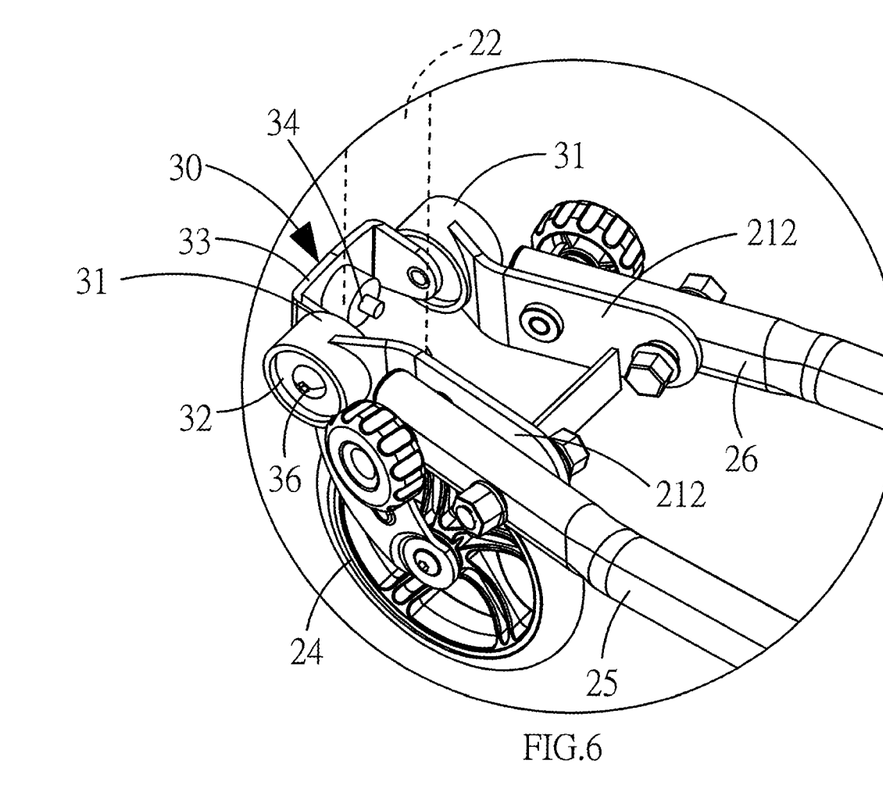
FIG. 6 is a structural perspective view of a flexible linkage mechanism of the present invention.

⊙ Optimal treading efficiency;
Δ Average treading efficiency;
X Poor treading efficiency Further, referring to FIGS. 2, 6 and 7, the flexible linkage mechanism 30 comprises two axial sleeves 31, at least two elastic buffer elements 32, a linkage body 33 and a through axis 34. The axial sleeves 31 are respectively disposed the vehicle frame 21 and relative to front ends of the left and right bearing bars 25 and 26. The elastic buffer elements 32 are accommodated in the respective axial sleeves 31. Two sides of the linkage body 33 are axially disposed at the respective elastic buffer elements 32. In the embodiment shown, the linkage body 33 may be a U-shaped body, and has two sides thereof disposed with two fixing members 36 for respectively coupling the linkage body 33 with the elastic buffer elements 32. The linkage body 33 is inserted into the elastic buffer elements 32 accommodated in the axial sleeves 31. The through axis 34 is disposed at the linkage body 33 and faces the upright arm 22, such that interference is formed between the linkage body 33 and the upright arm 22 via the through axis 34, and the linkage body 33 as well as the front ends of the left and right bearing bars 25 and 26 may utilize the through axis 34 as a turning point to perform up-and-down alternating swinging movements and elastic and flexible operations. As such, when the rider steps on the left and right footboards 51 and 52 and holds the handle 23, the rider may apply forces to the handle 23 by rocking left and right and apply downward forces by treading on the left and right footboards 51 and 52, thereby propelling the front wheel 24 swing left and right. Thus, the front wheel 24 rolls forward along a zigzag path to propel the left and right rear wheels 41 and 42, in a way that the entire kick scooter achieves the objects of sliding forward and exercising the rider for fitness. In the embodiment in the diagram, the linkage body 33 may be disposed relatively to the front end of the upright arm 22. In an alternative embodiment, the linkage body 33 may be disposed relatively to a rear end of the upright arm 22. The through axis may be a first screw fastening member soldered to a body of the upright arm, and the linkage body is fixedly provided with a corresponding second screw fastening member. By assembly the first and second screw fastening members, interference is formed between the linkage body and the upright arm.

Further, the flexible linkage mechanism may be a flexible body. The flexible body at least comprises glass fiber, a soft metal or polyurethane to similarly provide the left and right bearing bars with swinging torques.

Figure 7:
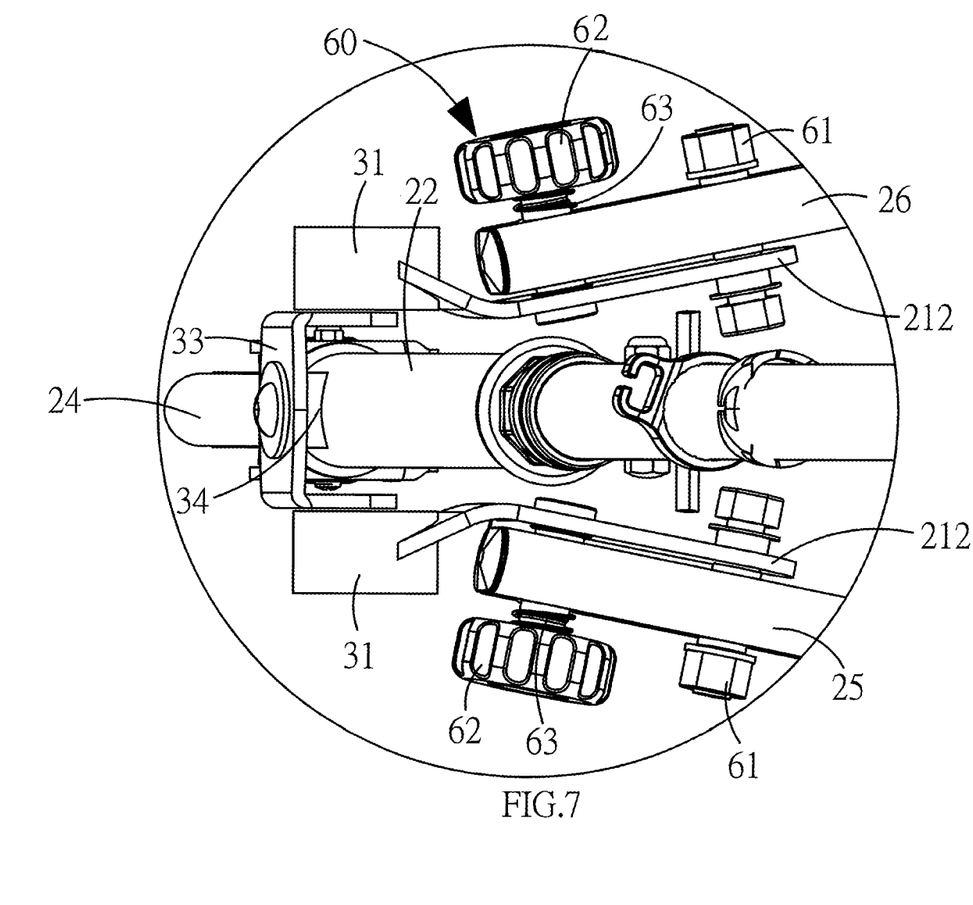
FIG. 7 is an enlarged schematic view of a flexible linkage mechanism of the present invention.
Figure 8:
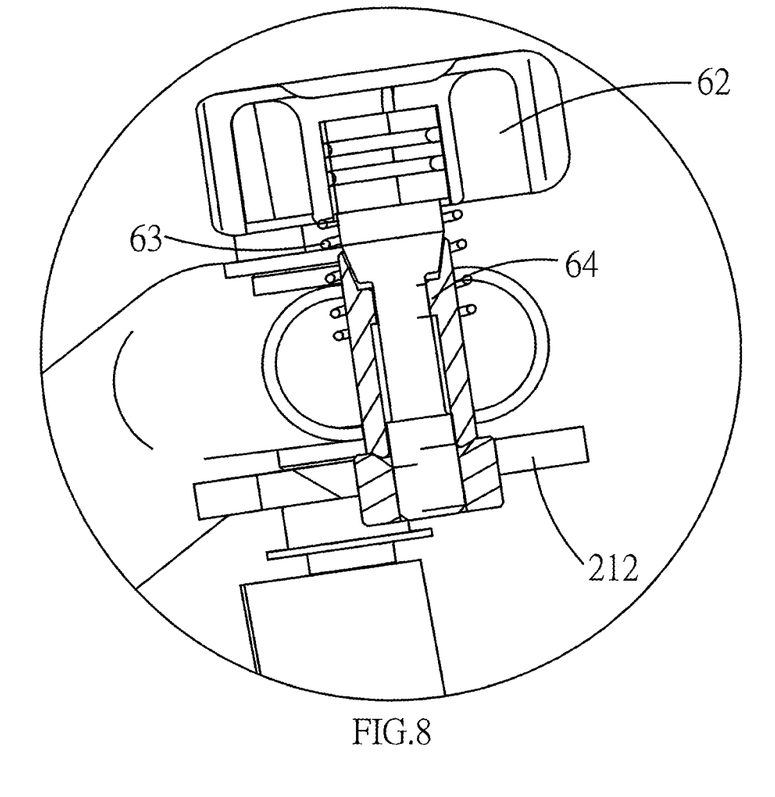
FIG. 8 is an enlarged schematic view of a collapsible mechanism of the present invention.
Figure 9:
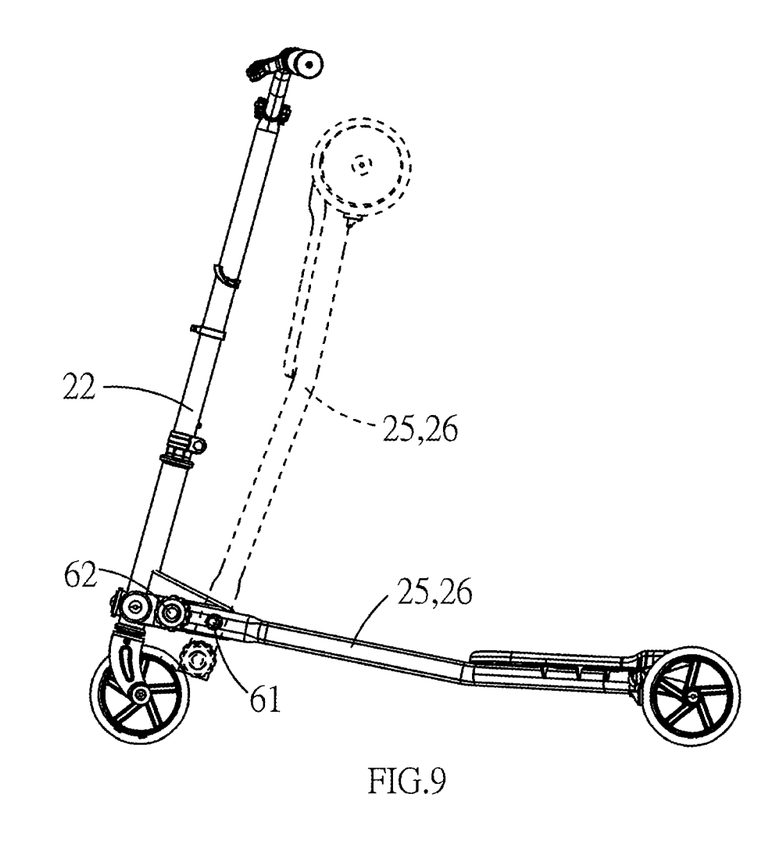
FIG. 9 is a structural schematic view of a collapsed kick scooter of the present invention.

Referring to FIGS. 7 and 8, the kick scooter of the present invention further comprises a collapsible mechanism 60. The collapsible mechanism 60 is disposed between the frame 21 and the left and right bearing bars 25 and 26, and is for collapsing the left and right bearing bars 25 and 26. The collapsible mechanism 60 comprises pivotal bolts 61, adjusting members 62 and elastic elements 63. The pivotal bolts 61 are pivotally provided between the respective axial plates 212 of the vehicle frame 21 and the left and right bearing bars 25 and 26. The adjusting members 62 are located at front ends of the respective pivotal bolt 61, and fasten the left and right bearing bars 25 and 26 onto the respective axial plates 212. The elastic elements 63 are accommodated around the respective adjusting members 62, and provide forces for moving the respective adjusting members 62 outward in a normal condition. To collapse the bearing bars 25 and 26, the bearing bars 25 and 26 are gradually loosened from the vehicle frame 21 by use of the respective adjusting members 62. With the forces of the elastic elements 63, the respective adjusting members 62 are moved outward. At this point, the left and right bearing bars 25 and 26 are only attached to the vehicle frame via the respective pivotal bolts 61, in a way that the left and right bearing bars 25 and 26 can be easily turned. Referring to FIG. 9, the left and right bearing bars 25 and 26 can be moved toward a direction parallel to the upright arm 22, so as to significantly reduce the volume of the kick scooter and achieve collapsibility for easy storage.

The collapsible mechanism 60 further comprises blocking members 64. The block members 64 are located in the left and right bearing bars 25 and 26 and are relative to axial positions of the respective adjusting members 64. When the adjusting members 62 move outward, the adjusting members 62 can be retained by the respective blocking members 64 to prevent total disengagement from the left and right bearing bars 25 and 26

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A kick scooter, comprising:
a vehicle frame;
an upright arm, disposed on the vehicle frame;
a handle, mounted to an upper end of the upright arm;
a front wheel, mounted to a lower end of the upright arm;
left and right bearing bars, having front ends thereof assembled to the vehicle frame;
a flexible linkage mechanism, coupled between the upright arm and the left and right bearing bars, configured to provide the left and right bearing bars with swinging torques;
left and right rear wheels, mounted to positions near rear positions of the left and right bearing bars, respectively; and
left and right footboards, disposed at positions near the rear ends of the left and right bearing bars, respectively; wherein centers of gravity of the left and right footboards are located between the left and right rear wheels,
wherein the left and right rear wheels are located to have rolling directions located at outer sides of the left and right bearing bars, respectively,
wherein the scooter further comprises a collapsible mechanism; the collapsible mechanism is disposed between the vehicle frame and the left and right bearing bars, and is for collapsing the left and right bearing bars, and
wherein the collapsible mechanism comprises pivotal bolts, adjusting members and elastic elements; the pivotal bolts are pivotally provided between the vehicle frame and the left and right bearing bars, respectively; the adjusting members are located at front ends of the respective pivotal bolts, and respectively fasten the left and right bearing bars onto the vehicle frame; the elastic elements are accommodated around the respective adjusting elements and provide forces for moving the respective adjusting elements outward in a normal condition.

2. The kick scooter according to claim 1, wherein the flexible linkage mechanism comprises two axial sleeves, at least two elastic buffer elements, a linkage body and a through axis; the axial sleeves are mounted to the vehicle frame and relatively to front ends of the left and right bearing bars; the elastic buffer elements are accommodated in the respective axial sleeves; the linkage body has sides thereof axially disposed at the elastic buffer elements; the through axis is provided at the linkage body to face the upright arm, and is inserted into a body of the upright arm to form interference between the linkage body and the upright arm via the through axis.

3. The kick scooter according to claim 2, wherein the linkage body is a U-shaped body, and has two sides thereof respectively provided with two fixing members for respectively connecting linkage body and the elastic buffer elements; the linkage body is inserted into the elastic buffer elements accommodated in the axial sleeves.

4. The kick scooter according to claim 2, wherein the linkage body is disposed relatively to a front end of the upright arm.

5. The kick scooter according to claim 2, wherein the linkage body is disposed relatively to a rear end of the upright arm.

6. The kick scooter according to claim 1, wherein the flexible linkage mechanism is a flexible body.

7. The kick scooter according to claim 6, wherein the flexible body at least comprises glass fiber, a soft metal or polyurethane.

8. The kick scooter according to claim 1, wherein the collapsible mechanism further comprises blocking members; the blocking members are located in the left and right bearing bars and relative to axial positions of the respective adjusting members, such that the adjusting members are prevented from total disengagement from the left and right bearing bars when moving outward.

9. The kick scooter according to claim 1, wherein a center of gravity of the left rear wheel utilizes a rearmost end of the left footboard as a center, is located in a second quadrant and a third quadrant, and has an angle $\theta 1$ ranging between 90 degrees and 270 degrees.

10. The kick scooter according to claim 9, wherein the center of gravity of the rear left wheel is located in the third quadrant, and has the angle $\theta 1$ greater than or equal to 180 degrees and smaller than 270 degrees.

11. The kick scooter according to claim 9, wherein the angle $\theta 1$ of the center of gravity of the rear left wheel has an optimal value of 180 degrees.

12. The kick scooter according to claim 1, wherein a center of gravity of the right rear wheel utilizes a rearmost end of the right footboard as a center, is located in a first quadrant and a fourth quadrant, and has an angle $\theta 2$ greater than or equal to 0 degree and smaller than 90 degrees or greater than 270 degrees and smaller than or equal to 360 degrees.

13. The kick scooter according to claim 12, wherein the center of gravity of the rear right wheel is located in the fourth quadrant, and has the angle $\theta 2$ greater than 270 degrees and smaller than or equal to 360 degrees.

14. The kick scooter according to claim 12, wherein the angle $\theta 2$ of the center of gravity of the rear right wheel has an optimal value of 0 degree or 360 degrees.

15. The kick scooter according to claim 1, wherein a left fulcrum and a right fulcrum are respectively formed by contact points between the left and right rear wheels and the ground; centers of gravity of the left and right footboards are located between the left and right fulcrums.

16. The kick scooter according to claim 1, further comprising an adjusting mechanism between the left and right rear wheels and the left and right bearing bars, the adjusting mechanism for adjusting positions and angles of the left and right rear wheels.

17. The kick scooter according to claim 1, wherein the vehicle frame comprises a main body, the main body comprises axial plates spaced at an interval at two sides thereof, the upright arm is mounted on the main body, the left and right bearing bars have front ends thereof pivotally disposed at one side of the respective axial plates, and the flexible linkage mechanism is disposed at one other side of the axial plates.

18. A kick scooter, comprising:
a vehicle frame;
an upright arm, disposed on the vehicle frame;
a handle, mounted to an upper end of the upright arm;
a front wheel, mounted to a lower end of the upright arm;
left and right bearing bars, having front ends thereof assembled to the vehicle frame;

a flexible linkage mechanism, coupled between the upright arm and the left and right bearing bars, configured to provide the left and right bearing bars with swinging torques;

left and right rear wheels, mounted to positions near rear positions of the left and right bearing bars, respectively; and left and right footboards, disposed at positions near the rear ends of the left and right bearing bars, respectively; wherein centers of gravity of the left and right footboards are located between the left and right rear wheels, wherein the left and right rear wheels are located to have rolling directions located at outer sides of the left and right bearing bars, respectively, wherein the flexible linkage mechanism comprises two axial sleeves, at least two elastic buffer elements, a linkage body and a through axis; the axial sleeves are mounted to the vehicle frame and relatively to front ends of the left and right bearing bars; the elastic buffer elements are accommodated in the respective axial sleeves; the linkage body has sides thereof axially disposed at the elastic buffer elements; the through axis is provided at the linkage body to face the upright arm, and is inserted into a body of the upright arm to form interference between the linkage body and the upright arm via the through axis, and wherein the linkage body is a U-shaped body, and has two sides thereof respectively provided with two fixing members for respectively connecting linkage body and the elastic buffer elements; the linkage body is inserted into the elastic buffer elements accommodated in the axial sleeves.

* * * * *